(12) United States Patent
Ye et al.

(10) Patent No.: US 12,049,746 B2
(45) Date of Patent: Jul. 30, 2024

(54) PUSH-BUTTON TYPE UPPER WATER INLET SHOWER COLUMN

(71) Applicant: RUNNER (XIAMEN) CORP., Fujian (CN)

(72) Inventors: Dexiang Ye, Fujian (CN); Xinzhan Hu, Fujian (CN); Yisheng Zhang, Fujian (CN)

(73) Assignee: RUNNER (XIAMEN) CORP., Xiamen (CN)

( * ) Notice: Subject to any disclaimer, the term of this patent is extended or adjusted under 35 U.S.C. 154(b) by 884 days.

(21) Appl. No.: 17/138,970

(22) Filed: Dec. 31, 2020

(65) Prior Publication Data

US 2022/0205229 A1 Jun. 30, 2022

(51) Int. Cl.
*E03C 1/02* (2006.01)
*F16K 5/12* (2006.01)
*B05B 1/16* (2006.01)
*E03C 1/04* (2006.01)
*F16K 11/044* (2006.01)
*F16K 11/078* (2006.01)

(52) U.S. Cl.
CPC ............. *E03C 1/023* (2013.01); *F16K 5/12* (2013.01); *B05B 1/1618* (2013.01); *E03C 1/0408* (2013.01); *F16K 11/0445* (2013.01); *F16K 11/0785* (2013.01)

(58) Field of Classification Search
CPC .......... E03C 1/023; E03C 1/0408; F16K 5/12; F16K 11/0445; F16K 11/0785; B05B 1/1618
USPC ........ 137/625, 801, 315.12; 4/597, 612, 601
See application file for complete search history.

(56) References Cited

U.S. PATENT DOCUMENTS 1,011,640 A * 12/1911 Parsons ..................... F16K 5/12
251/95
1,566,273 A * 12/1925 Gade ................... F16K 11/0445
137/625.5

(Continued)

*Primary Examiner* — Minh Q Le
(74) *Attorney, Agent, or Firm* — Jose Cherson Weissbrot

(57) ABSTRACT

The present invention discloses a push-button type upper water inlet shower column, which comprises an upper fixing seat connected with a water inlet tube, a water inlet channel and a water distribution valve core which can be communicated are arranged in the upper fixing seat, the water distribution valve core comprises a first water outlet hole and a second water outlet hole, and the first water outlet hole and the second water outlet hole can discharge water separately or in combination; the upper fixing seat is provided with a first water outlet channel connected with the first water outlet hole, and the upper fixing seat is provided with a second water outlet channel connected with the second water outlet hole; a lower fixing seat is arranged below the upper fixing seat, a connecting rod that can go up and down is arranged between the lower fixing seat and the upper fixing seat, the upper end of the connecting rod is connected with the water distribution valve core, the lower fixing seat is provided with a push button, the push button is connected with the other end of the connecting rod through a linkage mechanism to realize the lifting of the connecting rod, and the push-button type upper water inlet shower column can not only realize single water outlet, but also realize mixed water outlet.

20 Claims, 6 Drawing Sheets

(56) References Cited

U.S. PATENT DOCUMENTS

| | | | | |
|---|---|---|---|---|
| 1,666,531 A * | 4/1928 | Glauber | F16K 19/00 | 251/339 |
| 1,809,567 A * | 6/1931 | Pasman | F16K 11/0445 | 137/625.5 |
| 2,206,609 A * | 7/1940 | Klein | F16K 11/0445 | 137/625.5 |
| 2,274,787 A * | 3/1942 | Groen | F16K 11/0445 | 4/615 |
| 3,236,253 A * | 2/1966 | Symmons | F16K 11/0445 | 137/119.05 |
| 4,989,640 A * | 2/1991 | Steffes | F16K 11/044 | 137/625.5 |
| 5,845,670 A * | 12/1998 | Life | E03C 1/023 | 137/119.05 |
| 6,973,937 B1 * | 12/2005 | Yang | E03C 1/023 | 137/119.05 |
| 7,043,776 B1 * | 5/2006 | Wu | E03C 1/0408 | 4/601 |
| 8,919,709 B2 * | 12/2014 | Zhou | E03C 1/066 | 4/615 |
| 2006/0207667 A1 * | 9/2006 | Nikles | E03C 1/042 | 137/625.5 |
| 2012/0266992 A1 * | 10/2012 | Zhou | F16K 31/53 | 137/861 |
| 2013/0263950 A1 * | 10/2013 | Zhou | E03C 1/0408 | 137/625 |
| 2013/0291975 A1 * | 11/2013 | Fangmeier | F16K 11/0445 | 137/636.1 |
| 2015/0090813 A1 * | 4/2015 | Zhang | E03C 1/0409 | 137/625.6 |
| 2015/0360243 A1 * | 12/2015 | Soetaert | F16K 11/0445 | 4/615 |
| 2016/0138250 A1 * | 5/2016 | Zhang | F16K 31/1223 | 137/595 |
| 2016/0340874 A1 * | 11/2016 | Liang | E03C 1/0408 | |
| 2021/0372535 A1 * | 12/2021 | Xia | F16K 27/0263 | |

* cited by examiner

PUSH-BUTTON TYPE UPPER WATER INLET SHOWER COLUMN

CROSS-REFERENCE TO RELATED APPLICATIONS

This application claims priority to China Patent application No. 202010473315.3 filed May 29, 2020, all of which are hereby incorporated herein in their entireties by reference.

FIELD AND BACKGROUND OF THE INVENTION

1. Technical Field

The present invention relates to a push-button type upper water inlet shower column.

2. Description of Related Art

The existing upper water inlet shower column comprises a bent tube for top spray or shower head, a straight tube for lifting rod of shower socket, and a joint of a hand-held shower head, which are widely applied to the field of bathrooms. In order to switch the waterway, two small tubes are usually installed in the straight tube as the water inlet and outlet circuits, or the small tube is directly welded to the bent tube, which resulting in a long bent tube, and a lot of packaging materials are wasted, and assembly is troublesome. Most of the existing structures are that the upper water enters and then flows down to the water diversion component of the switch handle position to divide the water and then returns to the upper water outlet. The pipeline route through the water path is long, and the heat is locally dissipated, which wastes heat energy. The fixing seat needs to be provided with a water diversion sealing assembly, so that the structure of the fixing seat is complex. The existing structure has no function of mixing water outlet of a top-spraying shower head in the using process.

SUMMARY OF THE INVENTION

In order to solve the technical problems, the present invention aims to provide a push-button type upper water inlet shower column.

The present invention is realized by the following technical scheme:

A push-button type upper water inlet shower column comprises an upper fixing seat connected with a water inlet tube, a water inlet channel and a water distribution valve core which can be communicated are arranged in the upper fixing seat, the water distribution valve core comprises a first water outlet hole and a second water outlet hole, and the first water outlet hole and the second water outlet hole can discharge water separately or in combination; the upper fixing seat is provided with a first water outlet channel connected with the first water outlet hole, and the upper fixing seat is provided with a second water outlet channel connected with the second water outlet hole; a lower fixing seat is arranged below the upper fixing seat, a connecting rod that can go up and down is arranged between the lower fixing seat and the upper fixing seat, the upper end of the connecting rod is connected with the water distribution valve core, the lower fixing seat is provided with a push button, the push button is connected with the other end of the connecting rod through a linkage mechanism to realize the lifting of the connecting rod.

In the embodiment of the present invention, the water distribution valve core comprises a shell, a liftable Water distribution mandrel is arranged in the shell, and the Water distribution mandrel is connected with one end of a connecting rod, a first water outlet hole, a second water outlet hole and a water inlet hole are formed in the shell, the first water outlet hole and the second water outlet hole are distributed up and down, a sealing device capable of plugging the first water outlet hole or the second water outlet hole is arranged on the water distribution mandrel, and the sealing device can be located between the first water outlet hole and the second water outlet hole so that the first water outlet hole and the second water outlet hole can be communicated with water.

In the embodiment of the present invention, the linkage mechanism is disposed in the lower fixing seat, the linkage mechanism comprises a thrust block which one end of the thrust block is connected to the push button, the other end of the thrust block is provided with a first inclined plane, the upper end of the lower fixing seat is provided with a first socket, and the other end of the connecting rod can be inserted into the first socket and then matched and connected with the first inclined plane.

In the embodiment of the present invention, the linkage mechanism further comprises a base, the peripheral wall of the base is fitted with the inner wall of the lower fixing seat, the base has a window at one end which facing the push button, and the one end of the push button can pass through the window and be connected with the thrust block, and a spring is provided between the thrust block and the peripheral wall of the base at the periphery of the window.

In the embodiment of the present invention, a balance block is provided at the other end of the base, a second inclined plane is provided at one end of the balance block which facing the thrust block, the second inclined plane is coupled with the other end of the connecting rod, and a spring is provided between the other end of the balance block and the side wall of the base.

In the embodiment of the present invention, the base comprises a flat plate, the thrust block moves laterally on one end of the flat plate, and a guide groove is provided on the other end of the flat plate, a guide block is disposed below the balance block and is capable of engaging with the guide groove, and the balance block moves laterally on the other end of the flat plate.

In the embodiment of the present invention, the other end of the connecting rod has third inclined planes at both sides, and the third inclined planes can be matched and connected with the first inclined planes and the second inclined planes.

In the embodiment of the present invention, an outer tube is connected between the upper fixing seat and the lower fixing seat, the connecting rod is arranged in the outer tube, a second socket is arranged below the upper fixing seat, and one end of the connecting rod can be inserted from the second socket to be matched and connected with the lower end of the water distribution mandrel.

In the embodiment of the present invention, the other side of the lower fixing seat is matched and connected with one end of a connector, and the other end of the connector is matched and connected with the mounting wall.

In the embodiment of the present invention, the upper fixing seat comprises a horizontal tube and a vertical tube which are connected with each other, the water distribution mandrel, the first water outlet hole and the second water outlet hole are arranged on the vertical tube, the water inlet tube is matched and connected with the horizontal tube, and the water inlet channel and the second water outlet channel are arranged on the horizontal tube.

In the embodiment of the present invention, a partition is disposed within the horizontal tube, and the water inlet channel is disposed above the partition and the second water outlet channel is disposed below the partition.

In the embodiment of the present invention, an upper bent tube which communicated with the first water outlet channel is arranged at the upper end of the vertical tube and a top shower is connected to the water outlet end of the upper bent tube; a water outlet nozzle which communicated with the second water outlet channel is arranged below the horizontal tube, and the water outlet nozzle is connected with a shower head via a hose.

In the embodiment of the present invention, a return spring is disposed between the top of water distribution mandrel and the shell.

In the embodiment of the present invention, the periphery of the water distribution mandrel which located above and below the sealing device is provided with a sealing ring that can be matched with the shell.

The push-button type upper water inlet shower column of the present invention has the following beneficial effects: the water distribution valve core is directly installed on the upper fixing seat, the water flow line is short, and the heat energy is reduced and the energy is saved, the lower fixing seat and the outer tube are fixed shower columns and control components, but no water and no need to seal components, so that structure is simplified, material requirements and manufacturing cost are reduced, and a water mixing function can be achieved.

BRIEF DESCRIPTION OF THE DRAWINGS

In order to more clearly illustrate the technical solution of the present invention, the drawings used in the embodiments or the prior art descriptions will be briefly introduced below, and it is obvious that the drawings in the following description are only some embodiments of the present invention, and it is obvious for those skilled in the art to obtain other drawings based on the drawings without creative efforts.

DESCRIPTION OF THE PREFERRED EMBODIMENTS

Figure 1:
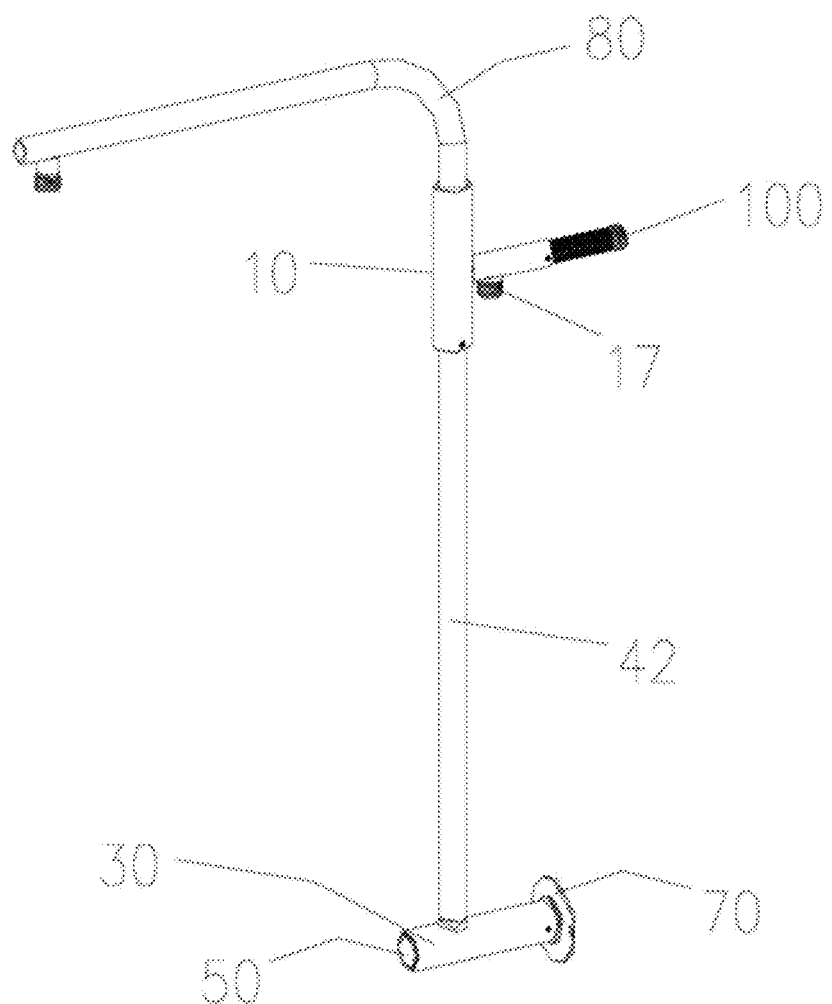
FIG. 1 is a stereogram view of the present invention.
Figure 2:
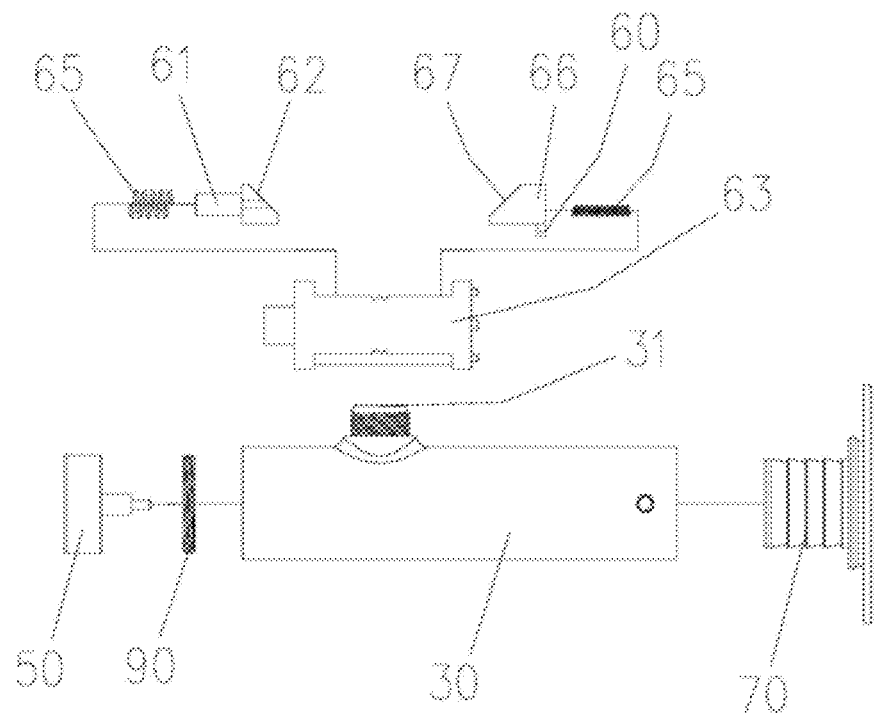
FIG. 2 is a partial exploded view of the present invention.
Figure 3:
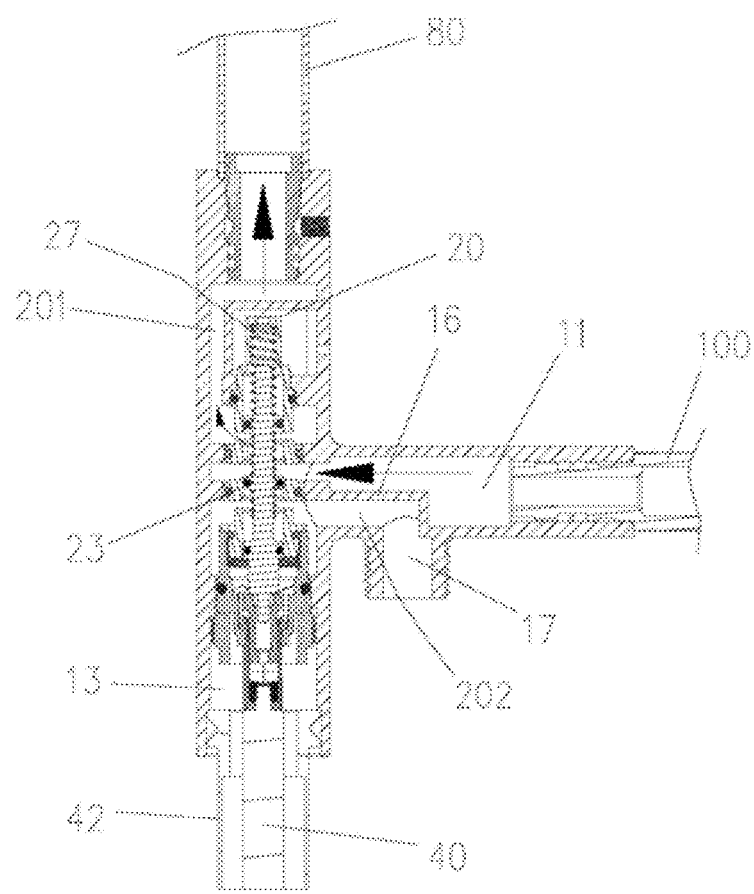
FIG. 3 is a first diagram illustrating of first state of the present invention.
Figure 4:
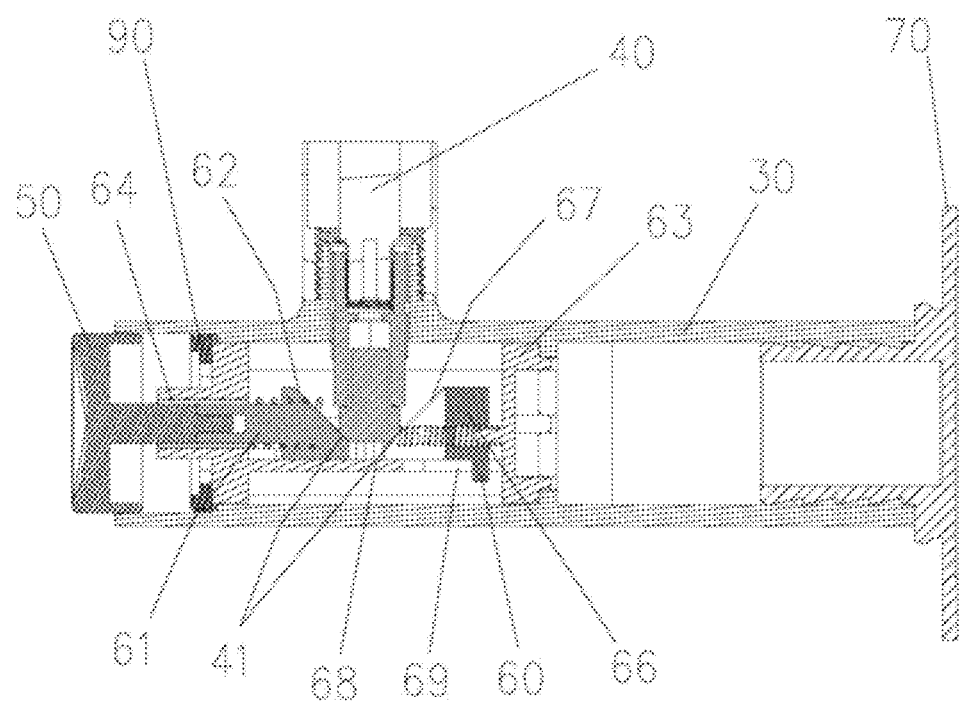
FIG. 4 is a second diagram illustrating of first state of the present invention.
Figure 5:
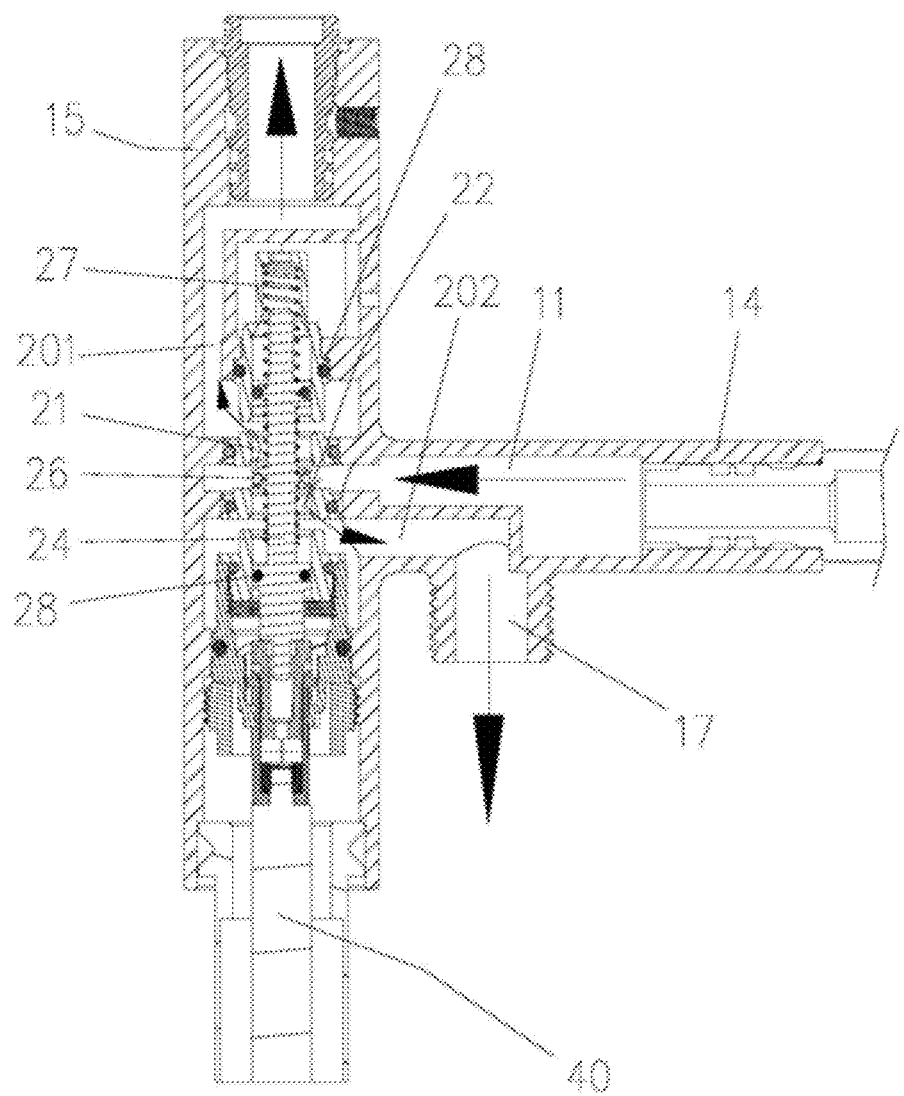
FIG. 5 is a first diagram illustrating of second state of the present invention.
Figure 6:
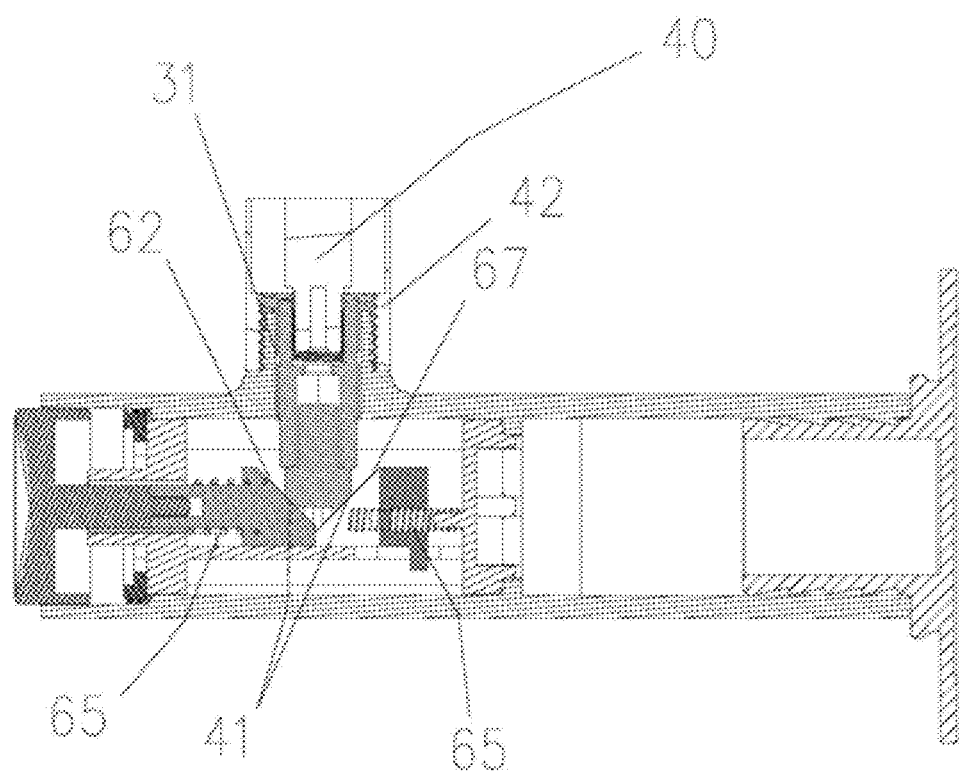
FIG. 6 is a second diagram illustrating of second state of the present invention.
Figure 7:
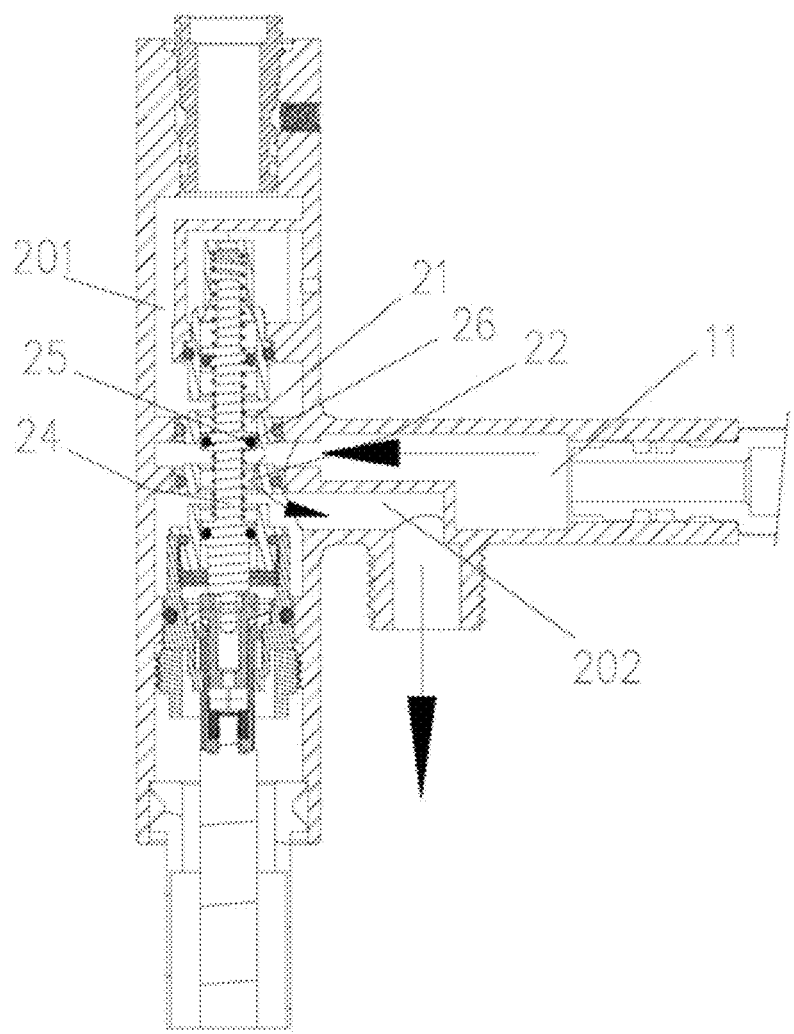
FIG. 7 is a first diagram illustrating of third state of the present invention.
Figure 8:
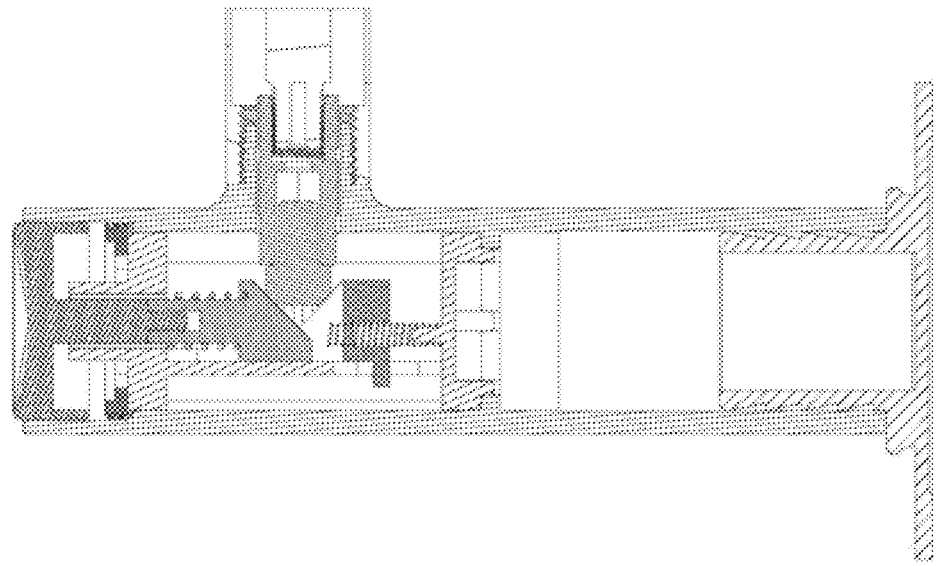
FIG. 8 is a second diagram illustrating of third state of the present invention.

The technical solutions in the embodiments of the present invention will be clearly and completely described below with reference to the drawings in the embodiments of the present invention, and it is obvious that the described embodiments are only a part of the embodiments of the present invention, and not all of the embodiments. All other embodiments, which can be obtained by a person skilled in the art without making any creative effort based on the embodiments of the present invention, belong to the protection scope of the present invention.

Referring to the attached drawings of the specification, a push-button type upper water inlet shower column comprises an upper fixing seat 10 connected with a water inlet tube 100, a water inlet channel 11 and a water distribution valve core 20 which can be communicated are arranged in the upper fixing seat 10, the water distribution valve core 20 comprises a first water outlet hole 21 and a second water outlet hole 22, and the first water outlet hole 21 and the second water outlet hole 22 can discharge water separately or in combination; the upper fixing seat 10 is provided with a first water outlet channel 201 connected with the first water outlet hole 21, and the upper fixing seat 10 is provided with a second water outlet channel 202 connected with the second water outlet hole 22; a lower fixing seat 30 is arranged below the upper fixing seat 10, a connecting rod 40 that can go up and down is arranged between the lower fixing seat 30 and the upper fixing seat 10, the upper end of the connecting rod 40 is connected with the water distribution valve core 20, and the connecting rod 40 is used to control the water distribution valve core 20 for water diversion switching, so that the water can be discharged from the first water outlet hole 21 or the second water outlet hole 22, and the water can be discharged from the first water outlet hole 21 and the second water outlet hole 22 at the same time. The lower fixing seat 30 is provided with a push button 50, preferably, one end of the lower fixing seat 30 is connected to the wall, and the push button 50 is arranged on the lower fixing seat 30 at the other end of the opposite wall, and the push button 50 is connected with the other end of the connecting rod 40 through a linkage mechanism to realize the lifting of the connecting rod 40. In the present invention, the water outlet condition of the water distribution valve core 20 is switched by pressing the push button 50.

Specifically, the water distribution valve core 20 comprises a shell 23, a liftable Water distribution mandrel 24 is arranged in the shell 23, preferably, a connecting rod 40 is mainly matched with the water distribution mandrel 24 to realize the work of the water distribution valve core 20, the water distribution mandrel 24 is connected with one end of a connecting rod 40, a first water outlet hole 21, a second water outlet hole 22 and a water inlet hole 25 are formed in the shell 23, the water inlet hole 25 is communicated with a water inlet channel 11 to control water paths of water flow to the water distribution valve core 20, the first water outlet hole 21 and the second water outlet hole 22 are distributed up and down, a sealing device 26 capable of plugging the first water outlet hole 21 or the second water outlet hole 22 is arranged on the water distribution mandrel 24, Preferably, the sealing device comprises a convex ring which arranged on the water diversion mandrel 24 and a sealing ring 28 which arranged on the outer periphery of the convex ring, the sealing device 26 can be located between the first water outlet hole 21 and the second water outlet hole 22 so that the first water outlet hole 21 and the second water outlet hole 22 can be communicated with water, in the state, the first water outlet hole 21 and the second water outlet hole 22 can both be used for communicating water, and when the sealing device 26 plugs the first water outlet hole 21, the second water outlet hole 22 can communicate water, and when the sealing device 26 plugs the second water outlet hole 22, the first water outlet hole 21 can communicate water.

More specifically: the linkage mechanism is disposed in the lower fixing seat 30, the linkage mechanism comprises a thrust block 61 which one end of the thrust block 61 is connected to the push button 50, the other end of the thrust block 61 is provided with a first inclined plane 62, the upper end of the lower fixing sea 30t is provided with a first socket 31, and the other end of the connecting rod 40 can be inserted into the first socket 31 and then matched and connected with the first inclined plane 62, the linkage mechanism further comprises a base 63, and the base 63 is fixed in the f lower fixing seat 30 through a lock nut 90, the peripheral wall of the base 63 is fitted with the inner wall of the lower fixing seat 30, so as to ensure that the base 63 will not shake in the lower fixing seat 30, the base 63 has a window at one end which facing the push button, and the one end of the push button can pass through the window 64 and be connected with the thrust block 61, and a spring 65 is provided between the thrust block 61 and the peripheral wall of the base 63 at the periphery of the window 64, and the spring 65 is mainly used to reset the thrust block 61, a balance block 66 is provided at the other end of the base 63, a second inclined plane 67 is provided at one end of the balance block 66 which facing the thrust block 61, the second inclined plane 67 is coupled with the other end of the connecting rod 40, and a spring 65 is provided between the other end of the balance block 67 and the side wall of the base 63, and the spring 65 is the same as the above which mainly to reset the balance block 67, the base 63 comprises a flat plate 68, the thrust block 61 moves laterally on one end of the flat plate 68, and a guide groove 69 is provided on the other end of the flat plate 68, a guide block 60 is disposed below the balance block 67 and is capable of engaging with the guide groove 69, and the balance block 67 moves laterally on the other end of the flat plate 68. Furthermore, the other end of the connecting rod 40 has third inclined planes 41 at both sides, and the third inclined planes 41 can be matched and connected with the first inclined planes 62 and the second inclined planes 67.

In one embodiment of the present invention, an outer tube 42 is connected between the upper fixing seat 10 and the lower fixing seat 30, the connecting rod 40 is arranged in the outer tube 42, a second socket 13 is arranged below the upper fixing seat 10, and one end of the connecting rod 40 can be inserted from the second socket 13 to be matched and connected with the lower end of the water distribution mandrel 24.

In order to better fix the shower column on the wall, the other side of the lower fixing seat 30 is matched and connected with one end of a connector 70, and the other end of the connector 70 is matched and connected with the mounting wall.

Further, the upper fixing seat 10 comprises a horizontal tube 14 and a vertical tube 15 which are connected with each other, the water distribution mandrel 24, the first water outlet hole 21 and the second water outlet hole 22 are arranged on the vertical tube 15, in other words, the water distribution mandrel 24 is arranged on the vertical tube 15, the water inlet tube 100 is matched and connected with the horizontal tube 14, and the water inlet channel 11 and the second water outlet channel 202 are arranged on the horizontal tube 14, a partition 16 is disposed within the horizontal tube 14, and the water inlet channel 11 is disposed above the partition and the second water outlet channel 202 is disposed below the partition 16, an upper bent tube 80 which communicated with the first water outlet channel 201 is arranged at the upper end of the vertical tube 15 and a top shower (not shown in the drawings) is connected to the water outlet end of the upper bent tube 80; a water outlet nozzle 17 which communicated with the second water outlet channel 202 is arranged below the horizontal tube 14, and the water outlet nozzle 17 is connected with a shower head via a hose, the hose and the shower are not shown in the drawing. In order to reset the water diversion valve core 20 when the water is turned off to ensure that water is discharged from the first water outlet every time the water is turned on, a return spring 27 is disposed between the top of water distribution mandrel 24 and the shell 23.

In order to ensure the overall tightness, the periphery of the water distribution mandrel 24 which located above and below the sealing device 26 is provided with a sealing ring 28 that can be matched with the shell 23.

The present invention discloses an upper water inlet shower column, which specifically comprises an upper fixing seat 10 and a lower fixing seat 30 fixed on a wall surface. The upper fixing seat 10 is provided with a pressing water distribution valve core 20, and the upper fixing seat 10 is connected with an upper bent tube 80 and a hose. A water inlet channel 11 is arranged in the upper fixing seat 10. The lower fixing seat 30 is provided with a transmission mechanism which composed of a push button 50, an inclined plane and a connecting rod 40. The water flows into the water distribution valve core 20 from the water inlet channel 11 of the upper fixing seat 10, and can flow out from the two water outlet holes. The user pushes the thrust block 61 with the inclined plane to move laterally by pressing the push button 50 of the lower fixing seat 30, and the inclined plane drives the connecting rod 40 in the vertical direction to press the water distribution mandrel 24 of the water distribution valve core 20 to realize the function of switching waterways. This mechanism can not only achieve two independent functions, but also achieve a mixed function. At the same time, the water no longer flows through the outer tube to the hose, so that can reduces the stroke of a water flow, reduces the heat dissipation and saving energy.

While the foregoing specification illustrates and describes the preferred embodiments of the present invention, it is to be understood that the invention is not limited to the forms disclosed herein, but is not to be construed as limited to the disclosed embodiments, and that modifications and environments may be utilized and adapted to various other combinations, modifications, and environments, and may be made within the scope of the inventive concept as described herein, either by the above teachings or by the skill or knowledge of the relevant art. And that modifications and variations may be effected by those skilled in the art without departing from the spirit and scope of the invention as defined by the appended claims.

What is claimed is:

1. A push-button type upper water inlet shower column, wherein comprising an upper fixing seat connected with a water inlet tube, a water inlet channel and a water distribution valve core which can be communicated are arranged in the upper fixing seat, the water distribution valve core comprises a first water outlet hole, a second water outlet hole, a shell, and a liftable water distribution mandrel arranged in the shell, and the water distribution mandrel is connected with one end of a connecting rod, the first water outlet hole, the second water outlet hole and a water inlet hole are formed in the shell, the first water outlet hole and the second water outlet hole are distributed up and down, a sealing device capable of plugging the first water outlet hole or the second water outlet hole is arranged on the water distribution mandrel, and the sealing device is located between the first water outlet hole and the second water outlet hole so that the first water outlet hole and second water outlet hole can be communicated with water, and the first water outlet hole and the second water outlet hole can discharge water separately or in combination; the upper fixing seat is provided with a first water outlet channel connected with the first water outlet hole, and the upper fixing seat is provided with a second water outlet channel connected with the second water outlet hole; a lower fixing seat is arranged below the upper fixing seat, a connecting rod that can go up and down is arranged between the lower fixing seat and the upper fixing seat, the upper end of the connecting rod is connected with the water distribution valve core, the lower fixing seat is provided with a push button, the push button is connected with the other end of the connecting rod through a linkage mechanism to realize the lifting of the connecting rod, wherein the linkage mechanism is disposed in the lower fixing seat, the linkage mechanism comprises a thrust block in which on end of the thrust block is connected to the push button, other end of the thrust block is provided with a first inclined plane, an upper end of the lower fixing seat is provided with a first socket, and the other end of the connecting rod can be inserted into the first socket and then matched and connected with the first inclined plane.

2. The push-button type upper water inlet shower column as claimed in claim 1, wherein the linkage mechanism further comprises a base, the peripheral wall of the base is fitted with the inner wall of the lower fixing seat, the base has a window at one end which facing the push button, and the one end of the push button can pass through the window and be connected with the thrust block, and a spring is provided between the thrust block and the peripheral wall of the base at the periphery of the window.

3. The push-button type upper water inlet shower column as claimed in claim 2, wherein a balance block is provided at the other end of the base, a second inclined plane is provided at one end of the balance block which facing the thrust block, the second inclined plane is coupled with the other end of the connecting rod, and a spring is provided between the other end of the balance block and the side wall of the base.

4. The push-button type upper water inlet shower column as claimed in claim 3, wherein the base comprises a flat plate, the thrust block moves laterally on one end of the flat plate, and a guide groove is provided on the other end of the flat plate, a guide block is disposed below the balance block and is capable of engaging with the guide groove, and the balance block moves laterally on the other end of the flat plate.

5. The push-button type upper water inlet shower column as claimed in claim 4, wherein the other end of the connecting rod has third inclined planes at both sides, and the third inclined planes can be matched and connected with the first inclined planes and the second inclined planes.

6. The push-button type upper water inlet shower column as claimed in claim 5, wherein an outer tube is connected between the upper fixing seat and the lower fixing seat, the connecting rod is arranged in the outer tube, a second socket is arranged below the upper fixing seat, and one end of the connecting rod can be inserted from the second socket to be matched and connected with the lower end of the water distribution mandrel.

7. The push-button type upper water inlet shower column as claimed in claim 6, wherein the other side of the lower fixing seat is matched and connected with one end of a connector, and the other end of the connector is matched and connected with the mounting wall.

8. The push-button type upper water inlet shower column as claimed in claim 1, wherein the upper fixing seat comprises a horizontal tube and a vertical tube which are connected with each other, the water distribution mandrel, the first water outlet hole and the second water outlet hole are arranged on the vertical tube, the water inlet tube is matched and connected with the horizontal tube, and the water inlet channel and the second water outlet channel are arranged on the horizontal tube.

9. The push-button type upper water inlet shower column as claimed in claim 8, wherein a partition is disposed within the horizontal tube, and the water inlet channel is disposed above the partition and the second water outlet channel is disposed below the partition.

10. The push-button type upper water inlet shower column as claimed in claim 9, wherein an upper bent tube which communicated with the first water outlet channel is arranged at the upper end of the vertical tube and a top shower is connected to the water outlet end of the upper bent tube; a water outlet nozzle which communicated with the second water outlet channel is arranged below the horizontal tube, and the water outlet nozzle is connected with a shower head via a hose.

11. The push-button type upper water inlet shower column as claimed in claim 10, wherein a return spring is disposed between the top of water distribution mandrel and the shell.

12. The push-button type upper water inlet shower column as claimed in claim 11, wherein the periphery of the water distribution mandrel which located above and below the sealing device is provided with a sealing ring that can be matched with the shell.

13. The push-button type upper water inlet shower column as claimed in claim 8, wherein the water distribution valve core comprises a shell, a liftable Water distribution mandrel is arranged in the shell, and the Water distribution mandrel is connected with one end of a connecting rod, a first water outlet hole, a second water outlet hole and a water inlet hole are formed in the shell, the first water outlet hole and the second water outlet hole are distributed up and down, a sealing device capable of plugging the first water outlet hole or the second water outlet hole is arranged on the water distribution mandrel, and the sealing device can be located between the first water outlet hole and the second water outlet hole so that the first water outlet hole and the second water outlet hole can be communicated with water.

14. The push-button type upper water inlet shower column as claimed in claim 8, wherein the linkage mechanism is disposed in the lower fixing seat, the linkage mechanism comprises a thrust block which one end of the thrust block is connected to the push button, the other end of the thrust block is provided with a first inclined plane, the upper end of the lower fixing seat is provided with a first socket, and the other end of the connecting rod can be inserted into the first socket and then matched and connected with the first inclined plane.

15. The push-button type upper water inlet shower column as claimed in claim 8, wherein the linkage mechanism further comprises a base, the peripheral wall of the base is fitted with the inner wall of the lower fixing seat, the base has a window at one end which facing the push button, and the one end of the push button can pass through the window and be connected with the thrust block, and a spring is provided between the thrust block and the peripheral wall of the base at the periphery of the window.

16. The push-button type upper water inlet shower column as claimed in claim 15, wherein a balance block is provided at the other end of the base, a second inclined plane is provided at one end of the balance block which facing the thrust block, the second inclined plane is coupled with the other end of the connecting rod, and a spring is provided between the other end of the balance block and the side wall of the base.

17. The push-button type upper water inlet shower column as claimed in claim 15, wherein the base comprises a flat plate, the thrust block moves laterally on one end of the flat plate, and a guide groove is provided on the other end of the flat plate, a guide block is disposed below the balance block and is capable of engaging with the guide groove, and the balance block moves laterally on the other end of the flat plate.

18. The push-button type upper water inlet shower column as claimed in claim 16, wherein the other end of the connecting rod has third inclined planes at both sides, and the third inclined planes can be matched and connected with the first inclined planes and the second inclined planes.

19. The push-button type upper water inlet shower column as claimed in claim 8, wherein an outer tube is connected between the upper fixing seat and the lower fixing seat, the connecting rod is arranged in the outer tube, a second socket is arranged below the upper fixing seat, and one end of the connecting rod can be inserted from the second socket to be matched and connected with the lower end of the water distribution mandrel.

20. The push-button type upper water inlet shower column as claimed in claim 8, wherein the other side of the lower fixing seat is matched and connected with one end of a connector, and the other end of the connector is matched and connected with the mounting wall.

\* \* \* \* \*